United States Patent [19]
Alling

[11] 3,787,104

[45] Jan. 22, 1974

[54] TWISTED BAR CAGE

[75] Inventor: Richard L. Alling, Torrington, Conn.

[73] Assignee: The Torrington Company, Torrington, Conn.

[22] Filed: Dec. 29, 1972

[21] Appl. No.: 319,854

[52] U.S. Cl. ............................................... 308/235
[51] Int. Cl. ............................................ F16c 33/30
[58] Field of Search ............................. 308/235, 217

[56] References Cited
UNITED STATES PATENTS
3,582,165   6/1971   Koch................................... 308/217

*Primary Examiner*—Charles J. Myhre
*Assistant Examiner*—Frank Susko
*Attorney, Agent, or Firm*—Frank S. Troidl

[57] ABSTRACT

A thrust-bearing cage is provided with twisted bars. The smaller width portion of the bar is connected to the inner rim, while the normal bar width is connected to the outer rim. Thus, more rollers can be placed in a cage having a predetermined inside diameter than can be placed in conventional cages having the same inside diameter.

6 Claims, 4 Drawing Figures

PATENTED JAN 22 1974 3,787,104

TWISTED BAR CAGE

This invention relates to bearings. More particularly, this invention is a new and improved bearing cage specifically invented to increase the number of rollers which can be placed in a thrust bearing.

Briefly described, our new bearing cage comprises an inner rim and an outer rim of greater diameter than the inner rim. A plurality of spaced members interconnect the two rims. The spaced members comprise a first rectangular bar portion extending from the outer rim toward the inner rim, and a second rectangular bar portion extending from the inner rim toward the outer rim, with the two portions integrally connected by a twisted portion. The first bar portion has a greater width than height; the second bar portion has a greater height than width.

The invention, as well as its many advantages, may be further understood by reference to the following detailed description and drawings in which.

Figure 1:
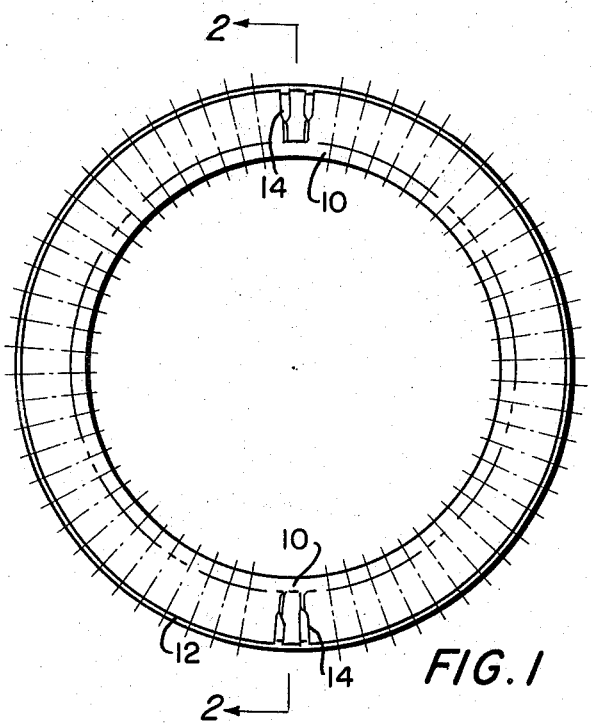
FIG. 1 is an elevational view of my new thrust-bearing cage with the bearings removed.

Referring to FIG. 1, the new twisted-bar cage includes an inner rim 10, and an outer rim 12 of greater diameter. A plurality of spaced members 14 interconnect the inner rim and the outer rim.

Figure 2:
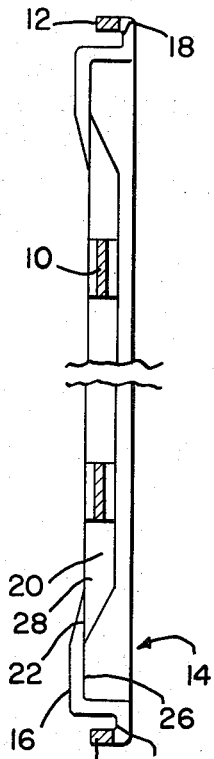
FIG. 2 is an enlarged view taken along lines 2—2 of FIG. 1.
Figure 4:
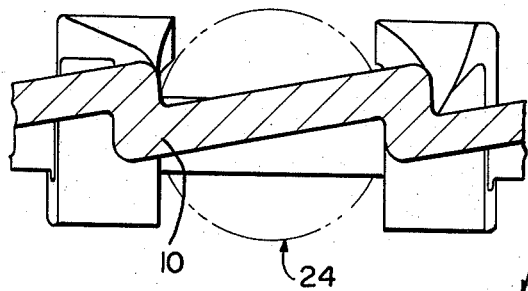
FIG. 4 is a view taken along lines 4—4 of FIG. 3.
Figure 3:
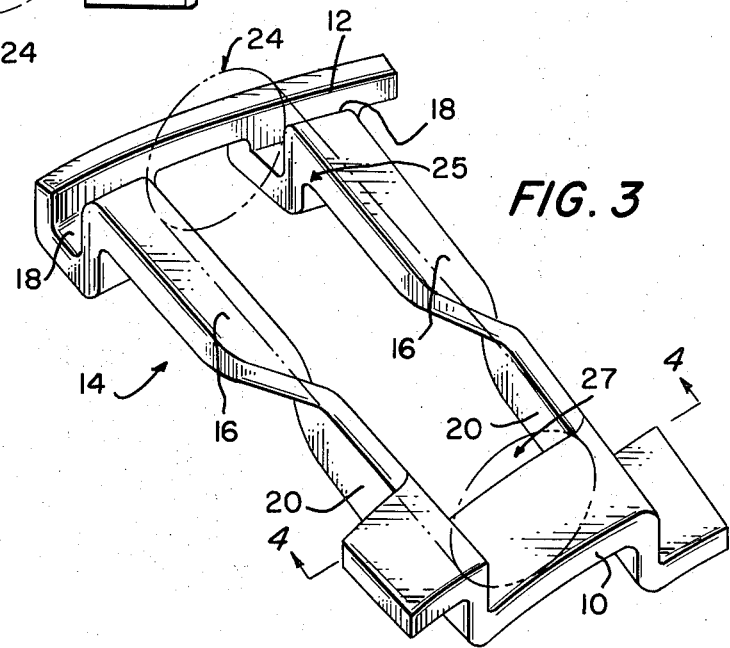
FIG. 3 is a isometric view, on an enlarged scale, of a portion of my new twisted-bar cage with a roller shown in place within the cage.

As shown more particularly in FIG. 2 and FIG. 3, each spaced member 14 includes a rectangular bar portion 16 which is connected integrally to the outer rim 12 by a U-shaped member 18. The rectangular bar portion 16 is also integrally connected to the rectangular bar portion 20 through a twisted portion 22. The twisted portion occurs at approximately the longitudinal center of the spaced member 14. Bar portion 20 is integrally connected to the inner rim 10. As shown in FIG. 3 and FIG. 4, the inner rim 10 is corrugated.

With currently used cages, in order to have sufficient strenght and to prevent the rollers 24 (see FIG. 3) from falling outwardly through the cage, it is necessary that the minimum width of each spaced member 14 be, say, two and one-half times its height. (With conventional bar cages, this ratio is the same throughout the length of the bar.) The number of rollers which can be inserted in a cage is limited by the spaces between the bars adjacent the inner rim because the inner rim has a diameter less than the outer rim.

By twisting the members 14 to provide a smaller width adjacent the inner rim, I have provided the art with a bar cage which will allow the use of more rollers than can be now used with conventional cages having the same inside diameter as my new bar cage and at the same time, provided the necessary limited space between each member 14 to guide the rollers 24. In the embodiment described herein, the width and height of the bar portion 16 are approximately equal to the height and width, respectively, of the bar portion 20. The inner rim 10 is so corrugated that the complete cage is of a generally annular form. Hence, the twisted-bar cage can be used with known thrust races.

Referring to FIGS. 2 and 3, it can be seen that the base 26 of bar portion 16 is aligned with the top 28 of bar portion 20. This arrangement, along with the U-shaped portion 18, inner rim 10, and outer rim 12, allows the rollers 24 to be located within the twisted-bar cage in the most advantageous manner. Specifically, the pitch line of the roller 24 bears against the inner edges of the outer rim 12 and inner rim 10 allowing maximum roller length. Also, the cylindrical surface of the rollers 24 at the pitch line bears against the inner upright side 25 of the U-shaped members 18 and the center 27 of the height portion of the rectangular bar portion 20.

Thus, the new twisted-bar cage provides all the advantages of conventional cages while increasing the number of rollers which can be placed within a cage of a particular inside diameter.

I claim:

1. A bearing cage for a thrust bearing comprising: an inner rim; and outer rim of greater diameter than the inner rim; a plurality of spaced members interconnecting the inner rim and the outer rim, each of said members including a first rectangular bar portion extending from the outer rim toward the inner rim and having a greater width than height, a second rectangular bar portion extending from the inner rim toward the outer rim and having a greater height than width, with the rectangular bar portions being integrally interconnected by a twisted portion.

2. A bearing cage in accordance with claim 1 wherein the twisted portion is located at the approximate longitudinal center of the member.

3. A bearing cage in accordance with claim 2 wherein the inner rim is corrugated.

4. A bearing cage in accordance with claim 3 wherein the width and the height of the first rectangular bar portions are approximately equal to the height and the width, respectively, of the second rectangular bar portion.

5. A bearing cage in accordance with claim 4 wherein the outer rim is connected to the first rectangular bar portion by a substantially U-shaped interconnecting member.

6. A bearing cage in accordance with claim 5 wherein the base of the first rectangular bar portion is aligned with the top of the second rectangular portion.

* * * * *